Patented Sept. 20, 1938

2,130,554

UNITED STATES PATENT OFFICE 2,130,554

PIGMENT SUSPENSIONS AND METHODS OF PREPARING SAME

Pierre Lusseyran, Paris, France, assignor, by mesne assignments, to Titan Company, Inc., Wilmington, Del., a corporation of Delaware No Drawing. Application July 3, 1936, Serial No. 88,851. In France July 26, 1935

16 Claims. (Cl. 134—58)

This invention relates to suspensions of pigments in various organic media. It has particular reference to the suspension or dispersion of titanium pigments, either pure titanium dioxide or composites thereof, in waxes, gums, resins and the like.

An object of this invention is stable, uniform suspensions of inorganic pigments in waxes, gums, resins and the like. Another object of the invention is novel methods for producing such suspensions. These and other objects will become apparent from the following detailed description of the invention:

Uniform stable suspensions of pigments, particularly titanium pigments, find a wide and varied application in the industrial arts. Solid suspensions are demanded as coating materials for paper, paperboard, fabrics, and the like and similar, though liquid, suspensions have been found useful as polishing or whitening agents for shoes, glues and many other articles.

The preparation of stable suspensions of pigments in oils, waxes and the like, has presented certain difficulties, due to the tendency of the pigment to settle out of suspension and form a hard cake on the bottom of the vessel containing the suspension. This is particularly true of titanium pigments and prior to my invention as herein set forth, I am not aware of any commercially successful suspensions of titanium pigments in waxes, resins or gums.

Suspensions of pigments in such materials are variously referred to as "suspensions", "dispersions" and occasionally as "emulsions". In this description of my invention and in the claims appended hereto, I use the term "suspension" to denote a uniform, substantially stable distribution of pigment particles throughout a more or less solid media such as wax, a resin, a gum, etc. In this sense, the term is synonymous to "dispersion" and "emulsion". The expression titanium pigment as used by me, includes not only titanium dioxide and composite pigments in which titanium dioxide is intimately associated with an extender such as calcium sulfate or barium sulfate, but titanate pigments such as titanates of zinc or alkaline-earth metals.

Briefly stated, my invention comprises intimately mixing together a pigment e. g. a titanium pigment, a wax, gum or resin and a novel dispersing agent, as by stirring at temperature above the melting point of the wax, gum or resin or by kneading on rollers, etc. The improved results of the invention, i. e. uniformity of suspension of the pigment particles in the wax, resin or gum, stability and ready dispersion of the pigment depend primarily upon the action of the novel dispersing agent and secondarily upon the manner of mixing of the three constituents.

I have discovered that substances derived from animal organs such as the brain, bile, nerve tissue, liver, spleen, blood, are particularly useful in dispersing or suspending pigments, especially titanium pigments in waxes, resins and gums. Among such substances which are particularly effective in the practice of my invention are those known as the lipoids, including the three classifications, as follows:

1. Lipoids containing nitrogen and phosphorus, known as phosphatides in which the nitrogen and phosphorus are in the relation of 1:1, for example, lecithin and cephalin or in the relation of 2:1, for example, spingomyclin.

2. Lipoids which contain nitrogen, for example, phrenosin and cerasin, and included the so-called "cerebrins" or "cerebrosides".

3. Lipoids which contain neither nitrogen nor phosphorus, for example, cholesterol, ergosterol, phytosterol.

Certain lipoids are derived from vegetable as well as from animal sources, for example lecithin is found in soya beans as well as animal proteins such as egg-yolk.

These materials are all of an extremely complex chemical nature. They usually contain as part of their molecular structure one or more of the following organic compounds: polycyclical alcohols, polyhydric alcohols, and fatty acid esters thereof, complex amino compounds, such as nitrogenous bases and amino acids and in the phosphatides phosphoric acid. As obtained from animal or vegetable sources, the lipoids may be associated with one or more of the organic compounds just mentioned, but not in chemical combination therewith. It will be understood that by the term "lipoid" as used by me in this description of my invention and in the claims attached hereto, I mean to include animal and vegetable lipoids as well as those organic compounds which may be classified under the three lipoid groups above enumerated and the organic compounds which in chemical combination one with the other constitute the lipoidal molecule.

It is often extremely difficult to obtain these compounds in relatively pure form except in such instances as cholesterol, ergosterol, and other materials for which a demand exists, for example, pharmaceutical, aside from their usefulness in the practice of my invention.

I have found that for the practice of my invention the dispersing agents within the scope of the invention may conveniently be used as extracts from the animal organs from which they are derived. For example, these extracts may be obtained by triturating or in other ways exposing animal organs, preferably as dry powders to the action of an organic solvent such as alcohol, ether, chloroform, acetone and the like. The resulting organic extract may be used in the practice of the invention or the organic solvent evaporated and only the solute used.

Very small amounts of these dispersing agents, either as the substantially pure organic compound or as mixtures obtained by extraction from animal organs are effective. There is observed a marked dispersing effect and stabilizing influence when these substances are used in proportions as low as 0.1% by weight of the dispersing media, such as the wax, resin or gum. Usually an amount between 0.25% and 2.0% is adequate to prepare a satisfactory uniform substantially stable suspension and it is seldom necessary to exceed 5.0%.

I have further found that dispersion and suspension of the pigment particles may be improved by subjecting the suspension to variations in temperatures. Thus, when a paraffin suspension is to be made, an improved result is obtained by cooling the suspension after the initial mixing to a temperature below the melting point of the paraffin, then reheating, agitating once more and again cooling. This procedure may be repeated as often as desired or found necessary. However, generally satisfactory results are obtained by melting the wax, gum or resin, adding the pigment and dispersing agents and stirring until a uniform suspension is obtained.

It will be understood that the materials most adaptable as suspending media are those which are thermoplastic, such as paraffin, waxes or greases, natural waxes, such as beeswax, ceresin, montan wax, carnuaba, spermaceti, etc. and thermoplastic gums and resins, the latter of which may be either natural or synthetic, for example, copal, kauri, gum arabic, tragacanth, etc. If the material is only slightly thermoplastic, that is, softens without liquefying, the dispersing of the pigment may be accomplished, according to the present invention, on heated mixing rolls or other suitable kneading device.

In this description of my invention and the claims appended hereto, I have used the term "thermoplastic suspension" to indicate suspensions of a pigment in a wax, resin or gum and I mean to include thereby, not only these waxes, resins and gums which are thermoplastic to the extent that they also soften, upon heating without liquefying, but also those which are fusible and can be rendered liquid.

I have also found it is sometimes desirable to dissolve or suspend the dispersing agent in a fatty substance such as lanolin or vaseline, which is miscible with the suspending media. It is also advantageous, in some instances, to prepare first a suspension containing a high percentage of pigment and using this as a "master batch" and later to prepare other suspensions containing a lesser proportion of pigment by the simple expedient of melting and stirring together a quantity of the master batch containing the desired amount of pigment and an additional amount of suspending media.

Having described my invention, the following specific examples are given for illustrative purposes from which no limitations are to be construed:

Example No. 1

Seventy kilograms of paraffin were melted and maintained at a temperature of 60°–65° C. 250 grams of cholesterine were then added to the molten paraffin. After the chloresterine had been thoroughly incorporated into the paraffin, 30 kilograms of titanium dioxide were added, in small individual batches, while agitating the molten paraffin cholesterine mixture. The whole was stirred until a homogenous suspension of the titanium dioxide in the paraffin was secured. The heating was then discontinued and the stirring continued while the mass cooled until it became too stiff to agitate further.

The resulting suspension contained about 30% $TiO_2$ and was used as a master batch for Example No. 2.

Example No. 2

Fifteen kilograms of the suspension obtained as directed in Example No. 1 containing 30% or 4.5 kilograms of titanium dioxide were melted with thirty kilograms of paraffin. The molten mixture was stirred until an apparently homogeneous suspension was obtained. The mass was then cooled, remelted, again agitated and finally allowed to cool.

The final product was a perfectly uniform stable suspension containing about 10% $TiO_2$.

Example No. 3

One hundred grams of lecithin were thoroughly and uniformly incorporated in 500 grams of lanolin by melting and stirring the two together. The mixture was added to forty kilograms of molten beeswax and to this was added in small amounts, with agitation, seven kilograms of Titanox B (titanium dioxide-barium sulfate composite pigment). Stirring was continued until a homogeneous suspension of the pigment was obtained. The mixture was then cooled. The resulting product contained in uniform suspension about 15% of Titanox B.

Example No. 4

A quantity of dried beef brains were triturated with ethyl alcohol. A determination of the solid content of the solution was made and a sufficient amount of solution taken to give about one hundred grams of solid extract and the solvent evaporated off.

Thirty-five kilograms of spermaceti were rendered plastic on slightly warmed mixing rolls. Three and one half kilograms of lead titanate pigment were gradually worked into the spermaceti and then the solid extract of beef brain added. The whole was then further worked on the rolls until a complete stable and uniform suspension of lead titanate in spermaceti resulted.

Example No. 5

A quantity of solution obtained as directed in Example No. 4 and containing about 100 grams of solid matter was poured into 30 kg. of molten paraffin and the alcohol evaporated off. To the resulting mixture, three kilograms of titanium dioxide was added in small batches, while stirring. The heating and stirring were continued until uniform dispersion of the pigment was effected. The resulting mass, when cooled, contained about 10% $TiO_2$.

Suspensions obtained according to my invention are perfectly stable when molten and may be melted and cooled any number of times.

They are particularly adaptable as coating or impregnating compositions.

For example, by dipping waxing stock in a molten suspension of titanium pigment an opaque waxed paper may be prepared. The same result may be secured by coating the waxing stock with the molten suspension by means of coating rolls. They are equally useful for impregnating or coating fabrics and the like.

The foregoing detailed description has been given for clearness of understanding and no undue limitations should be deduced therefrom, but the appended claims should be construed as broadly as possible in view of the prior art.

I claim:

1. A method of preparing stable thermoplastic pigment suspensions, which comprises intimately mixing a thermoplastic material, a titanium pigment and a small amount of a lipoid.

2. A method of preparing stable thermoplastic pigment suspensions, which comprises adding a small amount of a lipoid to a molten thermoplastic material, then, while agitating the molten mixture, adding a titanium pigment thereto.

3. A method of preparing a stable suspension of a titanium pigment in paraffin which comprises adding a small amount of a lipoid to molten paraffin, then while agitating the molten mixture, adding a titanium pigment thereto.

4. A method of preparing a stable suspension of a titanium pigment in paraffin which comprises adding a small amount of cholesterin to molten paraffin, then while agitating the molten mixture, adding thereto titanium pigment.

5. A method of preparing stable thermoplastic pigment suspensions which comprises kneading together a softened thermoplastic material and a small amount of a lipoid, then, while kneading the mixture, adding a titanium pigment thereto and continuing the kneading operation until a substantially uniform mixture is obtained.

6. A method for preparing a stable suspension of a titanium pigment in a wax which comprises melting a wax, adding to the molten mass lanolin containing a small amount of a lipoid, then while agitating the molten mixture, adding thereto a titanium pigment.

7. A method of preparing stable thermoplastic pigment suspensions, which comprises adding a small amount of a lipoid to a molten thermoplastic material, then while agitating the molten mixture, adding thereto a titanium pigment, continuing the agitation until the titanium pigment is thoroughly incorporated, cooling the mass until it solidifies, remelting the mass and again agitating until a substantially uniform suspension is obtained.

8. As a new composition of matter, a substantially uniform suspension of a titanium pigment in a thermoplastic material containing a small amount of a lipoid.

9. As a new composition of matter, a substantially uniform suspension of a titanium pigment in a thermoplastic material containing a small amount of a lipoid and which is substantially stable in the molten state.

10. As a new composition of matter a substantially uniform suspension of a titanium pigment in a wax containing a small amount of a lipoid and which is substantially stable in the molten state.

11. As a new composition of matter a substantially uniform suspension of titanium dioxide in paraffin containing a small amount of a lipoid and which is substantially stable in the molten state.

12. A method of preparing stable thermoplastic pigment suspensions, which comprises intimately mixing a thermoplastic material, an inorganic pigment, and a small amount of a lipoid dispersing agent for said pigment derived from an animal organ selected from the group consisting of the brain, bile, nerve tissue, liver spleen and blood.

13. A method of preparing stable thermoplastic inorganic pigment suspensions, which comprises adding to a molten thermoplastic material a small amount of a lipoid dispersing agent for said pigment derived from an animal organ selected from the group consisting of the brain, bile, nerve tissue, liver spleen and blood, then, while agitating the molten mixture, adding an inorganic pigment thereto.

14. A method of preparing stable thermoplastic pigment suspensions which comprises kneading together a softened thermoplastic material and a small amount of a lipoid dispersing agent for said pigment derived from an animal organ selected from the group consisting of the brain, bile, nerve tissue, liver spleen and blood, then, while kneading the mixture, adding an inorganic pigment thereto and continuing the kneading operation until a substantially uniform mixture is obtained.

15. A method for preparing stable thermoplastic pigment suspensions, which comprises incorporating with a thermoplastic material a dispersion of a small amount of a lipoid dispersing agent for said pigment derived from an animal organ selected from the group consisting of the brain, bile, nerve tissue, liver spleen and blood in a fatty material which is miscible with the said thermoplastic material, then, intimately mixing therewith an inorganic pigment.

16. A new composition of matter, a substantially uniform suspension of an inorganic pigment in a thermoplastic material containing a small amount of a lipoid dispersing agent for said pigment derived from an animal organ selected from the group consisting of the brain, bile, nerve tissue, liver spleen and blood.

PIERRE LUSSEYRAN.